(12) United States Patent
Park et al.

(10) Patent No.: US 11,610,520 B2
(45) Date of Patent: Mar. 21, 2023

(54) FOLDABLE DISPLAY APPARATUS

(71) Applicant: LG Display Co., Ltd., Seoul (KR)

(72) Inventors: Seongwoo Park, Paju-si (KR); SeungHan Paek, Paju-si (KR); HyunJin An, Paju-si (KR); Kyungjae Yoon, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 315 days.

(21) Appl. No.: 17/075,972

(22) Filed: Oct. 21, 2020

(65) Prior Publication Data

US 2021/0118337 A1 Apr. 22, 2021

(30) Foreign Application Priority Data

Oct. 22, 2019 (KR) .................. 10-2019-0131446

(51) Int. Cl.
*G09F 9/00* (2006.01)
*G09F 9/30* (2006.01)
*G06F 1/16* (2006.01)

(52) U.S. Cl.
CPC ............ *G09F 9/301* (2013.01); *G06F 1/1641* (2013.01); *G06F 1/1652* (2013.01); *G06F 2200/161* (2013.01)

(58) Field of Classification Search
CPC .................. G06F 1/189; G06F 1/181
See application file for complete search history.

(56) References Cited

U.S. PATENT DOCUMENTS

| | | | |
|---|---|---|---|
| 9,698,375 B2 | 7/2017 | Prushinskiy et al. | |
| 9,991,467 B2 | 6/2018 | Namkung et al. | |
| 10,074,824 B2 | 9/2018 | Han et al. | |
| 10,700,311 B2 | 6/2020 | Kwon et al. | |
| 2012/0307423 A1* | 12/2012 | Bohn | G06F 1/1641 361/679.01 |
| 2014/0306941 A1 | 10/2014 | Kim et al. | |
| 2014/0346474 A1* | 11/2014 | Jeong | H01L 51/0096 257/40 |

(Continued)

FOREIGN PATENT DOCUMENTS

| | | |
|---|---|---|
| CN | 106450024 A | 2/2017 |
| CN | 206400960 U | 8/2017 |

(Continued)

OTHER PUBLICATIONS

Office Action, issued in corresponding Indian Patent Application No. 202014045067, dated Aug. 31, 2021.

(Continued)

*Primary Examiner* — Pete T Lee

(74) *Attorney, Agent, or Firm* — Morgan, Lewis & Bockius LLP

(57) ABSTRACT

A foldable display apparatus includes a display panel including a flexible substrate, in which at least one folding area folded based on a folding axis and non-folding areas disposed at one side and the other side of the folding area are defined, a glass substrate disposed below the flexible substrate, including an opening portion corresponding to the folding area, and a pattern frame disposed below the glass substrate, wherein the flexible substrate includes at least one groove pattern formed to overlap the folding area, and the groove pattern is formed on a rear surface of the flexible substrate.

8 Claims, 13 Drawing Sheets

(56) References Cited

U.S. PATENT DOCUMENTS

| | | | |
|---|---|---|---|
| 2015/0014644 A1* | 1/2015 | Namkung | ............... H01L 51/56 438/42 |
| 2017/0042047 A1 | 2/2017 | Oh | |
| 2017/0271616 A1 | 9/2017 | Choi et al. | |
| 2018/0097197 A1 | 4/2018 | Han et al. | |
| 2019/0165076 A1 | 5/2019 | Lee et al. | |
| 2019/0165287 A1 | 5/2019 | Tian et al. | |
| 2019/0204872 A1 | 7/2019 | Lee | |

FOREIGN PATENT DOCUMENTS

| | | |
|---|---|---|
| CN | 104103669 B | 4/2018 |
| CN | 107886846 A | 4/2018 |
| CN | 109841656 A | 6/2019 |
| CN | 109994044 A | 7/2019 |
| KR | 10-2013-0076402 A | 7/2013 |
| KR | 10-2016-0130921 A | 11/2016 |
| KR | 10-2018-0036904 A | 4/2018 |

OTHER PUBLICATIONS

Office Action issued in corresponding Chinese Patent Application No. 202011108367.7 dated Jul. 4, 2022.

\* cited by examiner

FOLDABLE DISPLAY APPARATUS

CROSS-REFERENCE TO RELATED APPLICATIONS

This application claims the benefit of the Korean Patent Application No. 10-2019-0131446 filed on Oct. 22, 2019, which is hereby incorporated by reference as if fully set forth herein.

BACKGROUND

Technical Field

The present disclosure relates to a foldable display apparatus.

Discussion of the Related Art

Generally, a display apparatus is widely used as a display screen of various electronic devices such as a mobile communication terminal, an electronic diary, an electronic book, a portable multimedia player (PMP), a navigator, an Ultra Mobile PC (UMPC), a mobile phone, a smart phone, a tablet personal computer (PC), a watch phone, an electronic pad, a wearable device, a watch phone, a portable information device, a vehicle control display device, a television, a notebook computer, and a monitor.

As an application field of the display apparatus is enlarged, a foldable display apparatus which may be bent or is foldable has been continuously studied. For a foldable display apparatus that may be bent or is foldable, elements constituting the foldable display apparatus should be bent or foldable, and the foldable display apparatus requires high resistance for the occurrence of a crack that may be generated by repeated folding and unfolding operation.

In a general foldable display apparatus, the additional structure has been introduced to make sure of crack resistance. For this reason, problems occur in that a thickness of the foldable display apparatus becomes thick and a manufacturing process is complicated.

SUMMARY

Accordingly, embodiments of the present disclosure are directed to a foldable display apparatus that substantially obviates one or more of the problems due to limitations and disadvantages of the related art.

The inventors of the present disclosure have continuously studied and developed technologies that can improve crack resistance of a foldable display apparatus, and an object of the present disclosure is to provide a foldable display apparatus having improved crack resistance through an optimized lower structure of a display panel.

Additional features and aspects will be set forth in the description that follows, and in part will be apparent from the description, or may be learned by practice of the inventive concepts provided herein. Other features and aspects of the inventive concepts may be realized and attained by the structure particularly pointed out in the written description, or derivable therefrom, and the claims hereof as well as the appended drawings.

To achieve these and other aspects of the inventive concepts, as embodied and broadly described, a foldable display apparatus comprises a display panel including a flexible substrate, in which at least one folding area folded based on a folding axis and non-folding areas disposed at one side and the other side of the folding area are defined, a glass substrate disposed below the flexible substrate, including an opening portion corresponding to the folding area, and a pattern frame disposed below the glass substrate, wherein the flexible substrate includes at least one groove pattern formed to overlap the folding area, and the groove pattern is formed on a rear surface of the flexible substrate.

In another aspect, a foldable display apparatus comprises a display panel including a flexible substrate, in which at least one folding area folded based on a folding axis and non-folding areas disposed at one side and the other side of the folding area are defined, a glass substrate disposed below the flexible substrate, including an opening portion corresponding to the folding area, a pattern frame disposed below the glass substrate, and a filling member filled in the opening portion, wherein the filling member includes a filling member groove pattern corresponding to the folding area, and the filling member groove pattern is formed on a rear surface of the filling member.

In still another aspect, a foldable display apparatus comprises a display panel including a flexible substrate, in which at least one folding area folded based on a folding axis, non-folding areas disposed at one side and the other side of the folding area and a pad portion formed in at least a portion of the non-folding areas are defined, and a glass substrate disposed below the flexible substrate and formed to overlap the pad portion, wherein the flexible substrate includes at least one groove pattern formed to overlap the folding area, and the groove pattern is formed on a rear surface of the flexible substrate.

In further still another aspect, a foldable display apparatus comprises a display panel including a flexible substrate, in which at least one folding area folded based on a folding axis, non-folding areas disposed at one side and the other side of the folding area and a pad portion formed in at least a portion of the non-folding areas are defined, a glass substrate disposed below the flexible substrate and formed to overlap the pad portion, a filling member disposed on a rear surface of the flexible substrate, and a pattern frame covering the glass substrate and a rear surface of the filling member, wherein the filling member includes a filling member groove pattern corresponding to the folding area, and the filling member groove pattern is formed on the rear surface of the filling member.

The present disclosure may improve crack resistance through optimization of a lower structure of a display panel by a simplified process.

Also, the present disclosure may minimize the occurrence of crease caused by repeated folding and unfolding driving by forming a filling member in a folding area.

Also, the present disclosure may improve a color difference or visibility occurring between a glass substrate and another structure, which may be observed on a display surface of a display panel.

It is to be understood that both the foregoing general description and the following detailed description are exemplary and explanatory and are intended to provide further explanation of the inventive concepts as claimed.

BRIEF DESCRIPTION OF THE DRAWINGS

The accompanying drawings, which are included to provide a further understanding of the disclosure and are incorporated in and constitute a part of this application, illustrate embodiments of the disclosure and together with the description serve to explain various principles. In the drawings.

DETAILED DESCRIPTION

Figure 1:
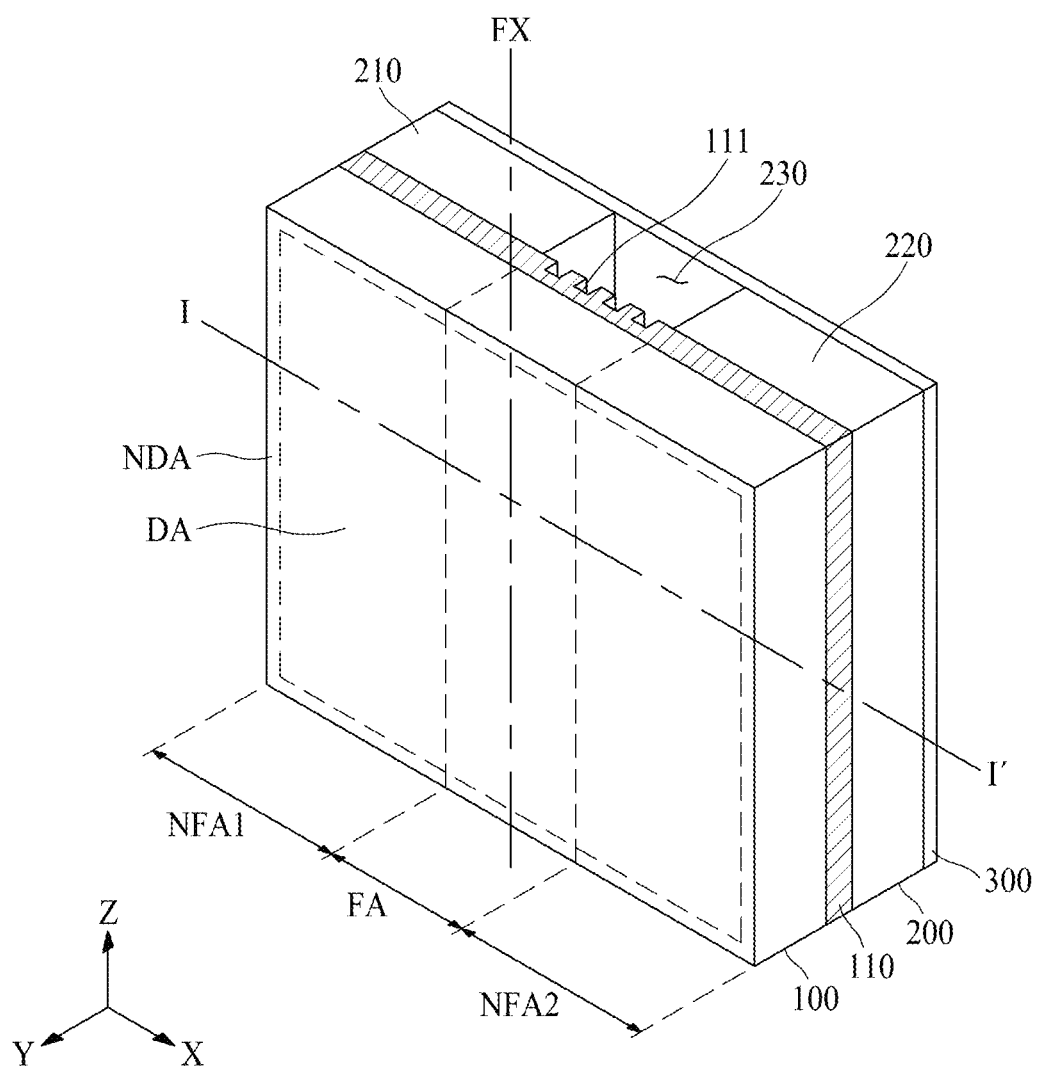
FIG. 1 is a perspective view illustrating a foldable display apparatus according to one embodiment of the present disclosure.

Advantages and features of the present disclosure, and implementation methods thereof will be clarified through following embodiments described with reference to the accompanying drawings. The present disclosure may, however, be embodied in different forms and should not be construed as limited to the embodiments set forth herein. Rather, these embodiments are provided so that this disclosure will be thorough and complete, and will fully convey the scope of the present disclosure to those skilled in the art. Further, the present disclosure is only defined by scopes of claims.

A shape, a size, a ratio, an angle, and a number disclosed in the drawings for describing embodiments of the present disclosure are merely an example, and thus, the present disclosure is not limited to the illustrated details. Like reference numerals refer to like elements throughout the specification. In the following description, when the detailed description of the relevant known function or configuration is determined to unnecessarily obscure the important point of the present disclosure, the detailed description will be omitted.

In a case where 'comprise', 'have', and 'include' described in the present specification are used, another part may be added unless 'only~' is used. The terms of a singular form may include plural forms unless referred to the contrary.

In construing an element, the element is construed as including an error range although there is no explicit description.

In describing a position relationship, for example, when the position relationship is described as 'upon~', 'above~', 'below~', and 'next to~', one or more portions may be arranged between two other portions unless 'just' or 'direct' is used.

In describing a time relationship, for example, when the temporal order is described as 'after~', 'subsequent~', 'next~', and 'before~', a case which is not continuous may be included unless 'just' or 'direct' is used.

It will be understood that, although the terms "first", "second", etc. may be used herein to describe various elements, these elements should not be limited by these terms. These terms are only used to distinguish one element from another. For example, a first element could be termed a second element, and, similarly, a second element could be termed a first element, without departing from the scope of the present disclosure.

The term "at least one" should be understood as including any and all combinations of one or more of the associated listed items. For example, the meaning of "at least one of a first item, a second item, and a third item" denotes the combination of all items proposed from two or more of the first item, the second item, and the third item as well as the first item, the second item, or the third item.

Features of various embodiments of the present disclosure may be partially or overall coupled to or combined with each other, and may be variously inter-operated with each other and driven technically as those skilled in the art can sufficiently understand. The embodiments of the present disclosure may be carried out independently from each other, or may be carried out together in co-dependent relationship.

Hereinafter, a foldable display apparatus and an electronic device comprising the same according to the present disclosure will be described in detail with reference to the accompanying drawings. Wherever possible, the same reference numbers will be used throughout the drawings to refer to the same or like parts. Since a scale of each of elements shown in the accompanying drawings is different from an actual scale for convenience of description, the present disclosure is not limited to the shown scale.

Figure 2A:
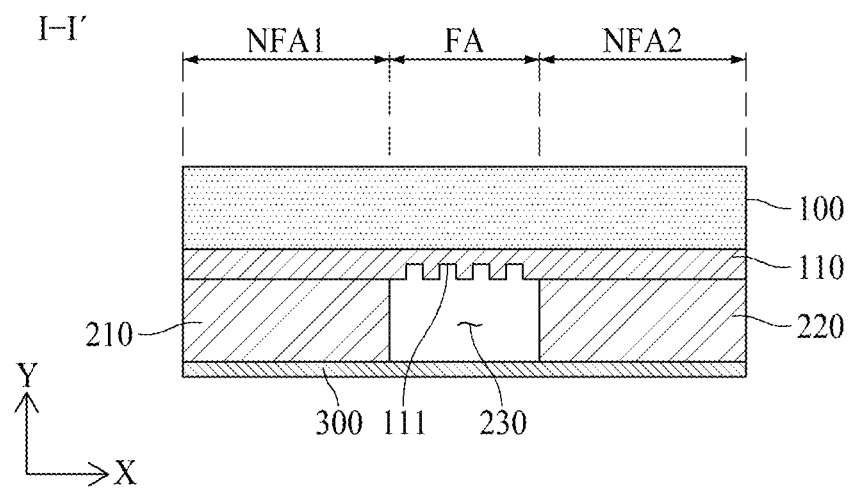
FIG. 2A is a cross-sectional view taken along line I-I' of FIG. 1.

FIG. 1 is a perspective view illustrating a foldable display apparatus according to one embodiment of the present disclosure, and FIG. 2A is a cross-sectional view taken along line I-I' of FIG. 1.

Referring to FIGS. 1 and 2A, the foldable display apparatus according to one embodiment of the present disclosure includes a display panel including a flexible substrate, in which at least one folding area folded based on at least one folding axis extended in one direction and non-folding areas disposed near the folding area are defined, a glass substrate disposed below the flexible substrate, including an opening portion corresponding to the folding area, and a pattern frame disposed below the glass substrate, wherein the flexible substrate includes at least one groove pattern formed to overlap the folding area and the groove pattern is formed on a rear surface of the flexible substrate.

The display panel 100 may include a display area DA and a non-display area NDA, and may include at least one folding area FA and a non-folding area NFA disposed at both sides of the folding area.

The display area DA may be defined as an area where pixels are disposed to display an image by combination of the pixels, and the non-display area NDA may be defined as an area surrounding the display area DA and may also be defined as an area where an image is not displayed. Also, the non-display area NDA may be defined as an area where a circuit line and a pad portion for driving the pixels of the display area DA are disposed.

The display panel 100 may include a flexible substrate 110. The flexible substrate 10 may be disposed below the display panel 100 and formed to adjoin a glass substrate 200.

The folding area FA may be defined as a predetermined area extended in a first direction (X direction) based on a folding axis FX and an opposite direction of the first direction. An area of the folding area FA may be controlled correspondingly in accordance with a design condition of the foldable display apparatus and a curvature of folding. The folding axis FX may be disposed in parallel with a third direction (Z axis), and may be defined to be located at the center of the folding area FA based on the first direction by crossing a third direction (Z) of the folding area FA. The folding axis FX may be located inside or outside the display panel in accordance with design of the foldable display apparatus.

The folding area FA may be folded in accordance with a specific curvature radius based on the folding axis FX. If the folding area FA is folded based on the folding axis FX, the folding area FA may partially form a curve, circle or oval. The curvature radius of the folding area FA may mean a radius of a curve, circle or oval corresponding to a portion of a curve, circle or oval formed by the folding area FA.

The non-folding area NFA is an area where the display panel 100 is not folded when the foldable display apparatus is folded. The non-folding area NFA is an area where the display panel 100 substantially maintains a plane state when the foldable display apparatus is folded. The non-folding area NFA may include a portion of the display area DA and a portion of the non-display area NA.

The non-folding area NFA may be an area located at both sides of the folding area FA. For example, the non-folding area NFA may be an area extended to one side and the other side in a first direction (X axis direction) based on the folding area FA. At this time, the folding area FA may be disposed between the non-folding areas NFA. Therefore, when the display panel 100 is inwardly folded based on the folding axis FX, the non-folding areas NFA located at both sides of the folding area FA may face each other. Alternatively, when the display panel 100 is outwardly folded based on the folding axis FX, non-folding areas NFA1 and NFA2 may face each other. Folding and unfolding driving of the foldable display apparatus according to the present disclosure will be described later with reference to FIG. 7.

According to some embodiments of the present disclosure, at least one folding area FA may be formed in the foldable display apparatus.

According to one embodiment of the present disclosure, one folding area FA may be formed in the foldable display apparatus, and may include a first non-folding area NFA1 and a second unfolding area NFA2 respectively disposed at left and right sides of the folding area. The first non-folding area NFA1 and the second non-folding area NFA2 may substantially be formed as plane surfaces even during folding and unfolding driving of the foldable display apparatus.

The flexible substrate 110 is a support substrate of the display panel 100, and may include a plastic material having flexibility. The flexible substrate 110, for example, may include any one of polyimide, polyurethane, acrylic based organic matter and silicone based organic matter.

The flexible substrate 110 may include at least one groove pattern 111 that may be formed on a rear surface of the flexible substrate 110. The groove pattern 111 may be formed to correspond to the folding area FA. In case of a general foldable display apparatus, a crack may occur in the flexible substrate 110 by repeated folding and unfolding operation. This crack may gradually be propagated to the foldable display apparatus by subsequent folding and unfolding, whereby a problem in the reliability may be caused. The foldable display apparatus according to one embodiment of the present disclosure may include at least one groove pattern 111 formed to corresponding to the folding area FA of the flexible substrate 110, wherein the groove pattern 111 may prevent crack propagation if the crack generated in the display panel is propagated through the folding area FA, and may improve the reliability of the flexible substrate 110 and the foldable display apparatus.

According to one embodiment of the present disclosure, the groove pattern may be a line pattern extended to be parallel with the folding axis.

The groove pattern 111 of the flexible substrate 110 may be provided with a plurality of line patterns extended in a third direction (Z direction), and may be provided in, but not limited to, various shapes such as rectangle, trapezoid, angled trench shape, and wave pattern recess shape.

Repeated compression and tensile stress generated by folding and unfolding operation of the folding area FA may be dispersed to a wide area formed by the groove pattern 111, whereby durability for folding and unfolding of the foldable display apparatus may be improved.

Also, the flexible substrate may support a pixel array layer, an encapsulation layer, etc. sequentially formed thereon. A detailed structure of the display panel will be described later with reference to FIG. 3.

The glass substrate 200 may include an opening portion 230 disposed below the flexible substrate 110, corresponding to the folding area FA. Also, if the foldable display apparatus has one folding area, the foldable display apparatus may include a first glass substrate 210 and a second glass substrate 220 that respectively support the first non-folding area NFA1 and the second non-folding area NFA2 located at left and right sides of the folding area FA. According to one embodiment of the present disclosure, the glass substrate 220 may include the opening portion 230 corresponding to the folding area FA of the display panel 100.

According to one example, etching surfaces of the first glass substrate 210 and the second glass substrate 220 may be formed to adjoin the opening portion 230, and may be located at a boundary of the folding area FA and the non-folding areas NFA1 and NFA2. However, the boundary the folding area FA and the non-folding areas NFA1 and NFA2 may be an area indicating a predetermined range including the boundary of the folding area FA and the non-folding areas NFA1 and NFA2.

According to one example, the glass substrate 200 may include, but not limited to, a soda-lime glass or a non-alkali glass. The glass substrate 200 may include a glass widely used to manufacture a flat display panel. Moreover, the glass substrate 200 may include any one or a deposited structure of sapphire glass and gorilla glass.

The glass substrate 200 according to one example may have a thickness of 0.01 mm to 1 mm to maintain the flatness of a display portion or shield water or oxygen from being permeated into the flexible display portion. However, the thickness of the glass substrate 200 may be modified depending on a size of the foldable display apparatus without limitation to the above example. The glass substrate 200 according to another example may have a thickness of 0.01 mm to 0.5 mm to shield water or oxygen from being permeated into the display portion and to be bent together with the display portion. However, the thickness of the glass substrate 200 may be modified depending on a size of the foldable display apparatus without limitation to the above example.

A pattern frame 300 may be disposed below the display panel 100, and may be coupled to the rear surface of the glass substrate 200 and a filling member 400 to cover the glass substrate 200, whereby rigidity of the display panel 100 from the external physical impact may be enhanced.

The pattern frame 300 according to one example may include a thin type metal plate made of a metal material. The pattern frame 300 according to another example may include a mesh plate or porous plate having a plurality of opening patterns 310 of a polygonal shape. For example, the pattern frame 300 may be made of any one material of Al, Mg, Al alloy, Mg alloy, and Mg—Li alloy.

According to one embodiment of the present disclosure, the foldable display apparatus may include the pattern frame 300 disposed on the rear surface of the glass substrate 200, whereby rigidity and flatness of the display panel may be enhanced. Also, the pattern frame 300 may include a fine pattern corresponding to the folding area FA. A detailed structure of the pattern frame 300 will be described later with reference to FIGS. 5A and 5B.

Figure 2B:
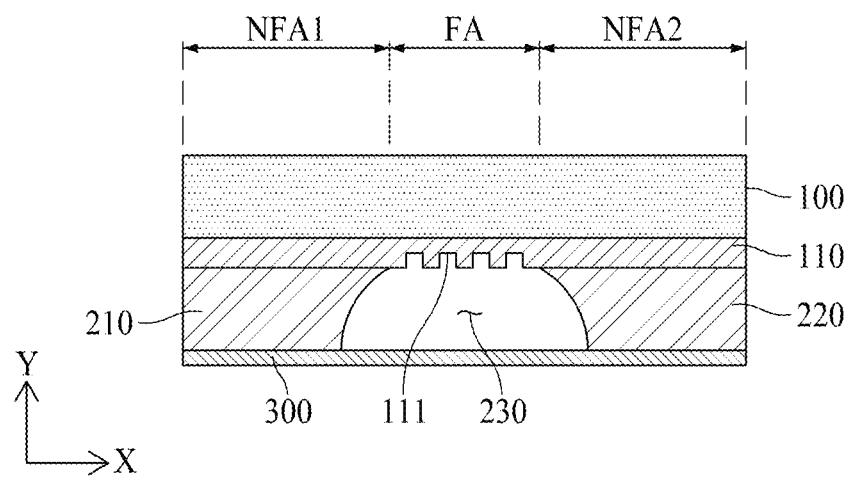
FIG. 2B is a cross-sectional view illustrating a foldable display apparatus according to one embodiment of the present disclosure.

FIG. 2B is a cross-sectional view illustrating a foldable display apparatus according to one embodiment of the present disclosure. Since the foldable display apparatus of FIG. 2B has a structure similar to that of the foldable display apparatus shown in FIG. 2A except that the first glass substrate 210 and the second glass substrate 220 are formed to have curved etching surfaces, its repeated description will be omitted.

Referring to FIG. 2B, the first glass substrate 210 and the second glass substrate 220 may have curved etching surfaces at sides exposed toward the opening portion 230. Also, according to one example, the opening portion 230 may be formed to overlap at least a portion of the non-folding areas NFA1 and NFA2 as well as the folding area FA, and may be formed to be widened toward a lower side of the opening portion 230. Also, the etching surfaces of the first glass substrate 210 and the second glass substrate 220 may be defined by an ends of upper surfaces of the first glass substrate 210 and the second glass substrate 220 and an ends of lower surfaces of the first glass substrate 210 and the second glass substrate 220, which are disposed to adjoin the opening portion. The ends of the upper surfaces of the first glass substrate 210 and the second glass substrate 220, which are adjacent to the opening portion 230, may be located at the boundary of the folding area FA and the non-folding areas NFA1 and NFA2, and the ends of the lower surfaces of the first glass substrate 210 and the second glass substrate 220, which are adjacent to the opening portion 230, may be formed at a position overlapped with the non-folding areas NFA1 and NFA2.

Also, in the present disclosure, the etching surfaces of the first glass substrate 210 and the second glass substrate 220 are not limited to curved etching surfaces, and etching surfaces of a non-vertical surface structure may be applied to the etching surfaces of the first glass substrate 210 and the second glass substrate 220 without limitation. In detail, etching surfaces of an slanted slope, a curved slope and a stepped slope may selectively be used depending on their sectional shape.

For convenience of description, although the etching surfaces of the first glass substrate 210 and the second glass substrate 220, which are adjacent to the opening portion 230, will be described based on the vertical surface structure, the scope of the present disclosure is not limited to this example.

Figure 3:
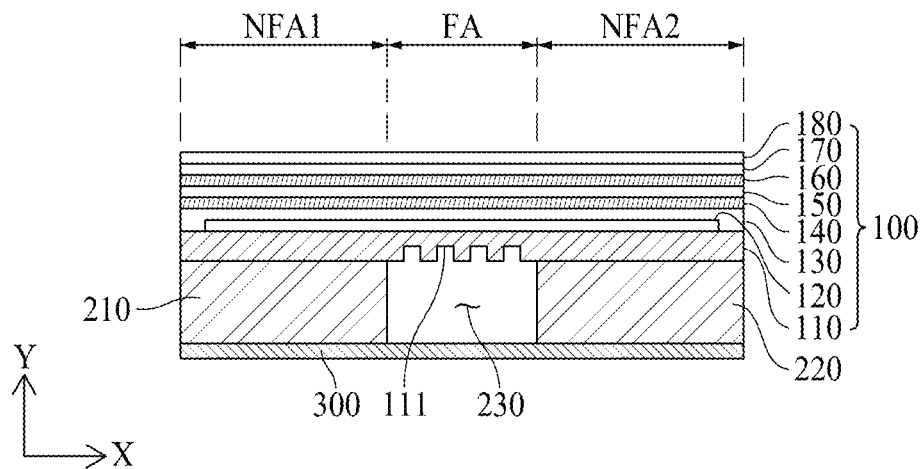
FIG. 3 is a detailed cross-sectional view illustrating a display panel according to one embodiment of the present disclosure.

FIG. 3 is a detailed cross-sectional view illustrating a display panel according to one embodiment of the present disclosure.

Referring to FIG. 3, the display panel according to one embodiment of the present disclosure may include a flexible substrate 110, and a pixel array layer 120, an encapsulation layer 130, a first adhesive layer 140, a touch sensing portion 150, a second adhesive layer 160, a function layer 170 and a cover layer 180, which are sequentially formed on the flexible substrate 110.

The pixel array layer 120 may be provided in a pixel area defined by signal lines provided on the flexible substrate 110, and may include a plurality of pixels for displaying an image in accordance with signals supplied to the signal lines.

Each of the plurality of pixels may include a pixel circuit layer including a driving thin film transistor provided in the pixel area, an anode electrode electrically connected with the driving thin film transistor, a light emitting diode layer formed on the anode electrode, and a cathode electrode electrically connected with the light emitting diode layer.

The driving thin film transistor is provided in a transistor area of each pixel area defined on the flexible substrate 110, and may include a gate electrode, a gate insulating film, a semiconductor layer, a source electrode, and a drain electrode. In this case, a semiconductor layer of the thin film transistor may include a silicon such as a-Si, poly-Si, or low temperature poly-Si, or may include an oxide such as Indium-Gallium-Zinc-Oxide (IGZO).

The anode electrode is provided in an opening area defined in each pixel area in a pattern shape and therefore electrically connected with the driving thin film transistor.

The light emitting diode layer according to one example may include an organic light emitting diode formed on the anode electrode. The organic light emitting diode may be formed in a deposited structure of a hole injecting layer, a hole transporting layer, an organic light emitting layer, an electron transporting layer and an electron injecting layer, which are sequentially deposited. In this case, one or two or more of the hole injecting layer, the hole transporting layer, the electron transporting layer and the electron injection layer may be omitted. The organic light emitting layer may be formed to emit light of the same color per pixel, for example, white light, or may be formed to emit light of a color different per pixel, for example, red light, green light or blue light.

The cathode electrode may commonly be connected with the light emitting diode layers provided in each pixel area.

The encapsulation layer 130 may be formed on the flexible substrate 110 to surround the pixel array layer 120, thereby preventing oxygen or water from being permeated into the light emitting diode layer of the pixel array layer 120. The encapsulation layer 130 according to one example may be formed in a multi-layered structure in which an organic material layer and an inorganic material layer are alternately deposited. In this case, the inorganic material layer may serve to shield oxygen or water from being permeated into the light emitting diode layer of the pixel array layer 120. For example, the encapsulation layer 130 may include a first inorganic film, an organic film on the first inorganic film, and a second inorganic film on the organic film.

The first adhesive layer 140 is disposed between the encapsulation layer 130 and the touch sensing portion 150, and attaches the encapsulation layer 130 to the touch sensing portion 150. The first adhesive layer 140 may include a pressure sensitive adhesive (PSA), an optically clear adhesive (OCA), or an optically clear resin (OCR).

The touch sensing portion 150 may be attached onto the encapsulation layer 130 by the first adhesive layer 140. The touch sensing portion 150 serves as a touch sensor disposed on the encapsulation layer 130, sensing a user's touch.

The touch sensing portion 150 according to one example may include a touch electrode layer disposed on the encapsulation layer 130 overlapped with the pixel array layer 120, and a dielectric layer covering the touch electrode layer. The touch sensing portion 150 may include a plurality of touch driving electrodes disposed on the encapsulation layer 130 overlapped with the pixel array layer 120 at constant intervals, and a plurality of touch sensing electrodes electrically insulated from the plurality of touch driving electrodes. The touch sensing electrodes may be disposed on the same layer as the touch driving electrodes, or may be disposed on their respective layers different from each other by interposing the dielectric layer therebetween.

The second adhesive layer 160 is disposed between the touch sensing portion 150 and the function layer 170, and attaches the touch sensing portion 150 to the function layer 170. The second adhesive layer 160 may be formed of the same material as that of the first adhesive layer 140.

The function layer 170 may be formed on the touch sensing portion 150.

The function layer 170 may include an anti-reflection layer (or anti-reflection film) for improving outdoor visibility and contrast ratio for an image displayed on the display portion DP by preventing reflection of external light. For example, the anti-reflection layer may include a circular polarizing layer (or circular polarizing film) that shields reflective light reflected by the thin film transistor and/or lines disposed on the pixel array layer 120 from progressing to the outside.

Also, the function layer 170 may further include a light path controlling layer (or light path controlling film) for controlling a path of light emitted from the pixel array layer 120 to the outside. The light path controlling layer may include a structure that a high refractive layer and a low refractive layer are deposited alternately, whereby a path of light incident from the pixel array layer 120 may be changed to minimize color shifting according to a viewing angle.

The cover layer 180 may include a thin and transparent flexible film such as plastic. The cover layer 180 may be disposed on the function layer 170, and the cover layer 180 may be disposed on the outmost of the display panel 100 to protect the display panel 100 from external impact.

Figure 4A:
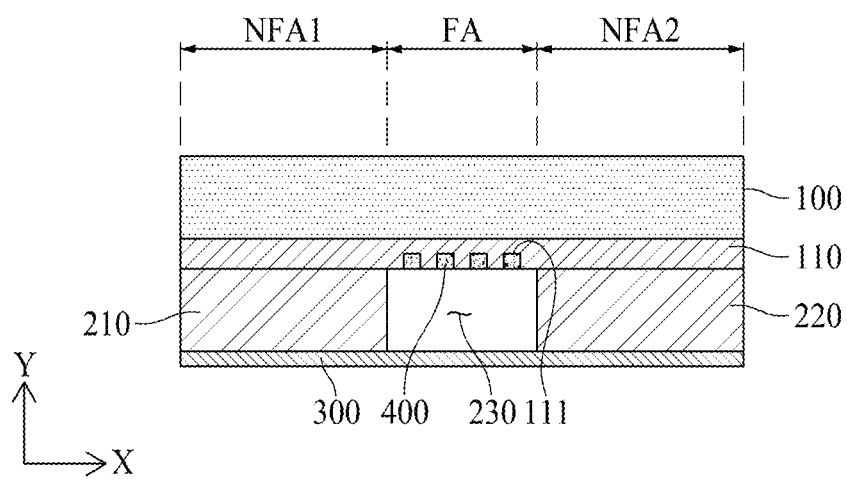
FIGS. 4A to 4C are cross-sectional views illustrating a foldable display apparatus according to one embodiment of the present disclosure.
Figure 4B:
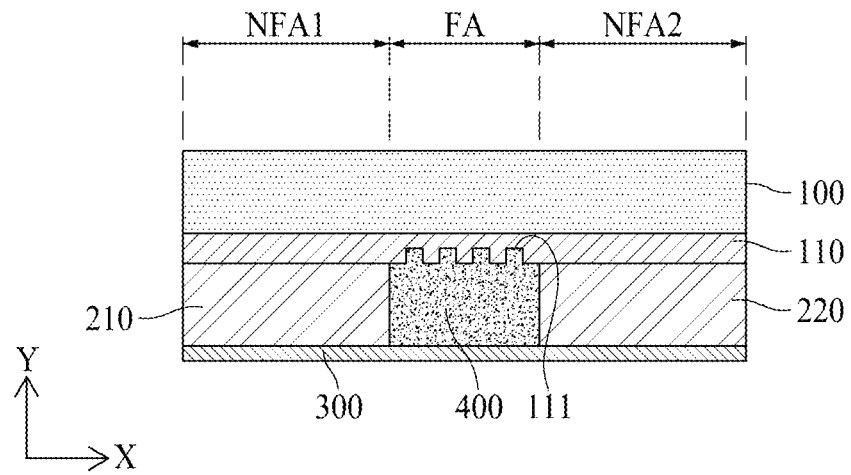
Figure 4C:
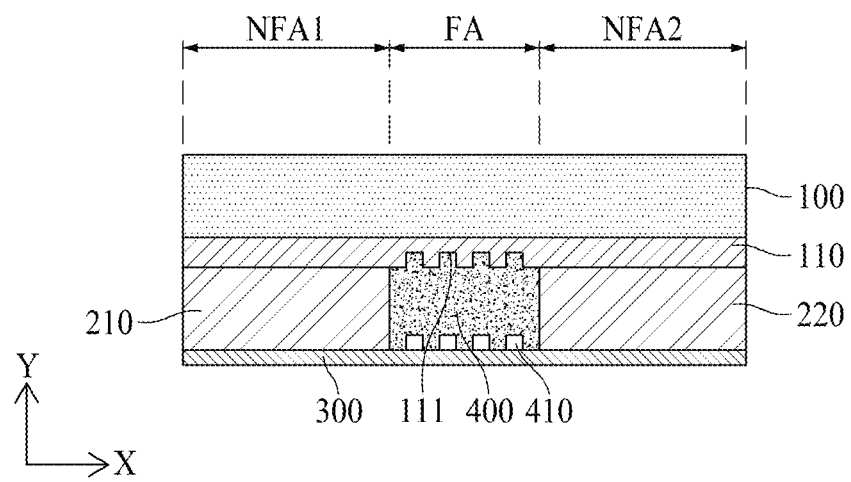

FIGS. 4A to 4C are cross-sectional views illustrating a foldable display apparatus according to one embodiment of the present disclosure.

Referring to FIG. 4A, the foldable display apparatus according to one embodiment of the present disclosure may further include a filling member 400. The filling member 400 may be formed to fill the groove pattern 111 of the flexible substrate 110. The filling member 400 filled in the groove pattern 111 during folding and unfolding operation of the foldable display apparatus according to the present disclosure may provide a predetermined restoring force after folding and unfolding operation of the foldable display apparatus. Crease generated in the folding area FA may be minimized through the restoring force of the filling member 400.

In this case, crease means a curved state that the folding area FA remains without being restored during the folding and unfolding operation of the foldable display apparatus.

Also, as shown in FIG. 4B, the filling member 400 may be formed to fill the groove pattern 111 of the flexible substrate 110 and additionally fill the opening portion 230 of the glass substrate 200. The filling member 400 filled in the groove pattern 111 and the opening portion 230 during folding and unfolding operation of the foldable display apparatus according to the present disclosure may provide a predetermined restoring force after folding and unfolding operation, and crease generated in the folding area FA may be minimized through the restoring force of the filling member 400.

As shown in FIG. 4B, if the filling member 400 is filled in the opening portion 230 of the glass substrate, the pattern frame 300 may support the filling member 400 filled in the opening portion 230 while supporting the first glass substrate 210 and the second glass substrate 220. As a result, the rigidity and the flatness of the display panel 100 may be enhanced.

Also, the pattern frame 300 may prevent the folding area FA from having waviness due to a step difference between the filling member 400 and the glass substrate 200 by supporting or covering a rear surface of the filling member 400 filled in the opening portion 230 of the glass substrate 200.

The pattern frame 300 according to one example may be coupled to the rear surface of the glass substrate 200 or the filling member 400 by a frame adhesive member. In this case, the frame adhesive member may be a pressure sensitive adhesive (PSA), an optically clear adhesive (OCA), or an optically clear resin (OCR).

Referring to FIG. 4C, according to the present disclosure, the filling member 400 may include a filling member groove pattern 410 formed on the rear surface of the filling member 400.

Since the filling member groove pattern 410 is formed on the rear surface of the filling member 400 formed in the opening portion, the filling member groove pattern 410 may be formed to correspond to the folding area FA. In case of a general foldable display apparatus, a crack may occur in the flexible substrate 110 by repeated folding and unfolding operation. This crack may gradually be propagated to the foldable display apparatus by subsequent folding and unfolding, whereby a problem in reliability may be caused. The filling member groove pattern 410 may be formed to correspond to the folding area FA and may prevent crack propagation if the crack generated in the display panel is propagated through the folding area FA.

According to one example, the property of the filling member 400 may be controlled through the formation of the filling member groove pattern 410.

Also, although FIG. 4C illustrates that the filling member groove pattern 410 has the same shape as that of the groove pattern 111 of the flexible substrate 110, the filling member groove pattern 410 may be designed to be the same as or different from the groove pattern 111 of the flexible substrate 110 in accordance with a design condition of the foldable display apparatus.

According to one example, the filling member 400 may shield water or oxygen from being permeated into the flexible substrate 110 through the opening portion 230 of the glass substrate, whereby reliability of the foldable display apparatus may be improved.

The filling member 400 according to one example may be formed as a liquid resin, for example, organic resin is filled (or buried) in the groove pattern 111 or the opening portion 230 through a jetting process or a dispensing process and then hardened by a photo-hardening process. This filling member 400 may be made of a liquid resin and filled (or permeated) into a gap between the flexible substrate 110 and the glass substrate 200 adjacent to the opening portion 230. To this end, the filling member 400 may include a material having moistureproofing characteristic which having adhesive characteristic, and may include an optical bond hardened by UV. For example, the filling member 400 may include an acryl or silicon based adhesive material.

Figure 5A:
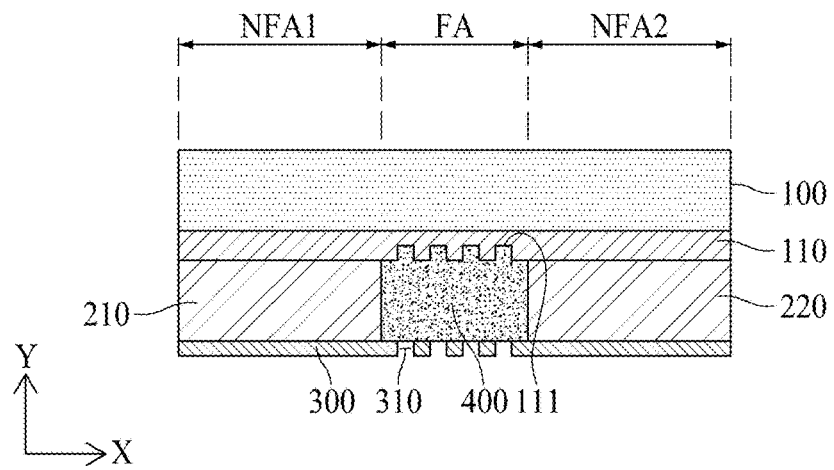
FIG. 5A is a cross-sectional view illustrating a foldable display apparatus according to one embodiment of the present disclosure.
Figure 5B:
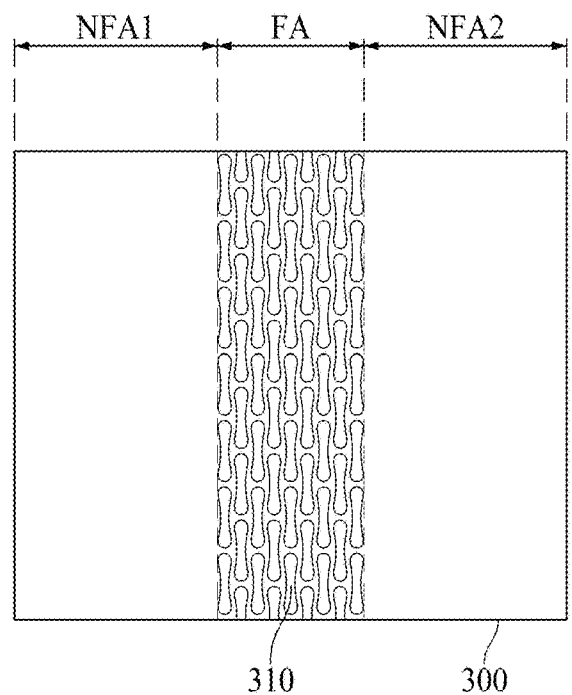
FIG. 5B is a plane view of a pattern frame according to one embodiment of the present disclosure.

FIG. 5A is a cross-sectional view illustrating a foldable display apparatus according to one embodiment of the present disclosure, and FIG. 5B is a plane view of a pattern frame 300 according to one embodiment of the present disclosure.

Referring to FIG. 5A, the pattern frame 300 may include a plurality of opening patterns 310 corresponding to the folding area FA. The plurality of opening patterns 310 may be formed to correspond to the folding area FA. However, the area where the plurality of opening patterns 310 are formed is not limited to the folding area FA, and at least a portion of the area may be formed to overlap the non-folding areas NFA1 and NFA2 in accordance with a design condition of the foldable display apparatus.

Referring to FIG. 5B, the opening patterns 310 of the pattern frame 300 may be formed in a slit shape to be spaced apart from one another. The shape of the opening patterns 310 is not limited to the example of FIG. 5B, or the opening patterns 310 may be provided in various shapes.

Also, although the opening patterns 310 are omitted from the pattern frame 300 in the drawings except FIGS. 5A and 5B of the present disclosure, it is to be understood that the opening patterns 310 of the pattern frame 300 may selectively be applied to various embodiments of the present disclosure.

Figure 6A:
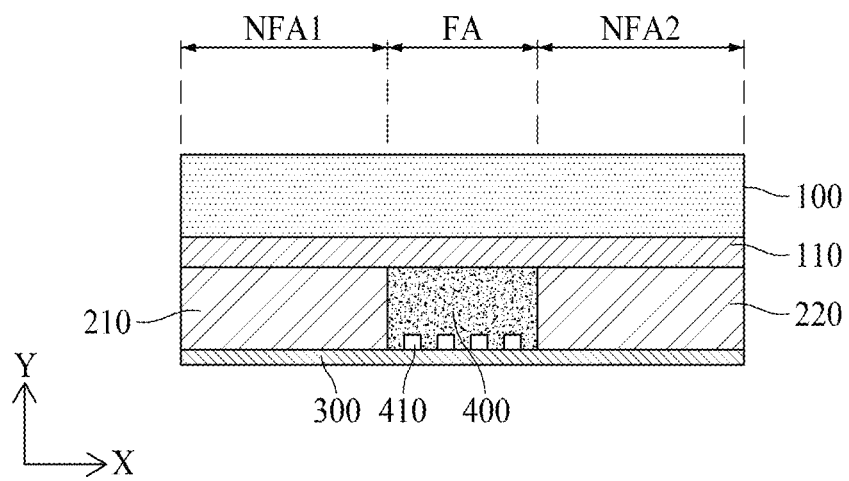
FIGS. 6A and 6B are cross-sectional views illustrating a foldable display apparatus according to one embodiment of the present disclosure.
Figure 6B:
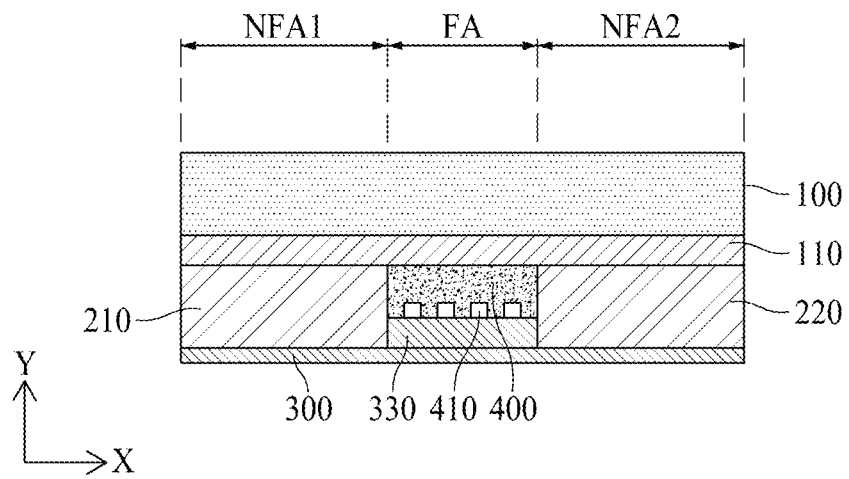

FIGS. 6A and 6B are cross-sectional views illustrating a foldable display apparatus according to one embodiment of the present disclosure. It is noted from the foldable display apparatus according to another embodiment of the present disclosure that the groove pattern 111 is not formed in the flexible substrate 110 as shown in FIGS. 6A and 6B.

Since the foldable display apparatus according to another embodiment of the present disclosure in FIG. 6A is the same as the foldable display apparatus in FIG. 4C except that the groove pattern 111 is not formed, its repeated description will be omitted.

The foldable display apparatus according to another embodiment of the present disclosure includes a display panel 100 including a flexible substrate 110, in which at least one folding area FA folded based on a folding axis FX and non-display areas NFA1 and NFA2 respectively disposed at one side and the other side of the folding area FA are defined, and a glass substrate 200 disposed below the flexible substrate 110, including an opening portion 230 corresponding to the folding area FA, a pattern frame 300 disposed below the glass substrate 200, and a filling member 400 filled in the opening portion, wherein the filling member 400 includes a filling member groove pattern 410 corresponding to the folding area FA, and the filling member groove pattern 410 is formed on a rear surface of the filling member 400.

As shown in FIG. 6A, according to another embodiment of the present disclosure, the filling member 400 may include a filling member groove pattern 410 formed on a lower surface of the filling member 400.

Since the filling member groove pattern 410 is formed on the rear surface of the filling member 400 formed in the opening portion, the filling member groove pattern 410 may be formed to correspond to the folding area FA. In case of a general foldable display apparatus, a crack may occur in the flexible substrate 110 by repeated folding and unfolding operation. This crack may gradually be propagated to the foldable display apparatus by subsequent folding and unfolding, whereby a problem in reliability may be caused. The filling member groove pattern 410 may be formed to correspond to the folding area FA, and may prevent crack propagation if the crack generated in the display panel is propagated through the folding area FA.

Referring to FIG. 6B, according to another embodiment of the present disclosure, the pattern frame 300 may further include an additional pattern frame 330 disposed in the folding area FA between the first glass substrate 210 and the second glass substrate 220 and formed on the pattern frame 300. The additional pattern frame 330 may be formed on the pattern frame 300, and may be formed to have a plane dimension corresponding to the opening portion of the glass substrate 200. The additional pattern frame 330 may be provided as the same material as that of the pattern frame 300, and the pattern frame 300 and the additional pattern frame 330 may be provided in a single body or provided to be attached to each other by an adhesive.

According to another embodiment of the present disclosure, as the additional pattern frame 330 is additionally formed, the thickness of the filling member 400 may be controlled, whereby a neutral plane may be controlled. According to one example, relative thickness of the filling member 400 and the additional pattern frame 330 may be controlled to locate the neutral plane in the thin film transistor layer, whereby a maximum stress value may be reduced during folding and unfolding operation.

Figure 7:
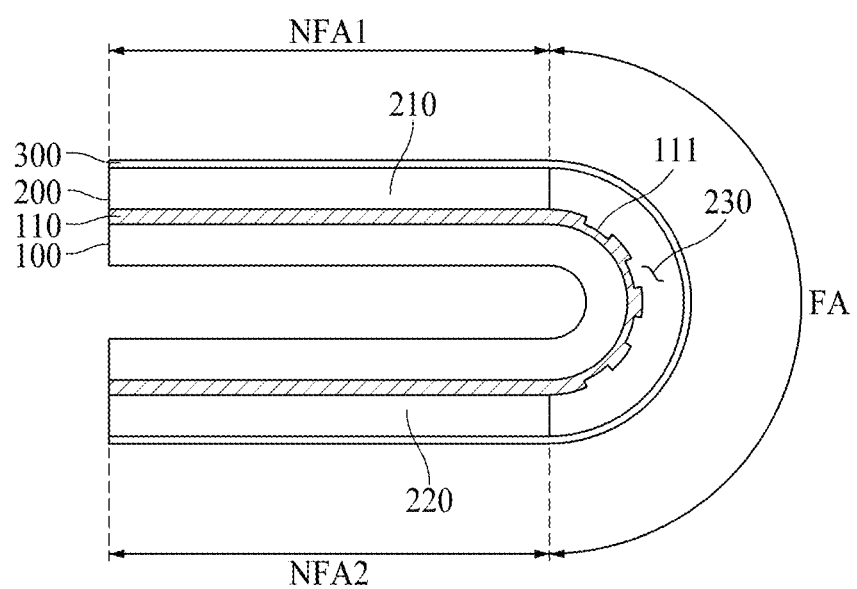
FIG. 7 is a cross-sectional view illustrating a folding appearance of a foldable display apparatus according to one embodiment of the present disclosure.

FIG. 7 is a cross-sectional view illustrating a folding appearance of a foldable display apparatus according to one embodiment of the present disclosure. In FIG. 7, the foldable display apparatus has an inner folding structure in which a display surface located in the first non-folding area NFA1 and a display surface located in the second non-folding area NFA2 face each other.

Also, the foldable display apparatus according to the present disclosure is not limited to inner folding, and outer folding in which the display surface located in the first non-folding area NFA1 and the display surface located in the second non-folding area NFA2 are exposed to the outside may be applied to the foldable display apparatus.

If inner folding and non-folding are applied to the foldable display apparatus according to the present disclosure, compression stress and tensile stress act on the folding area FA. In this way, since the stress of different directions may act on the folding area of the foldable display apparatus, problem occur in that delamination of several layers constituting the foldable display apparatus may be generated or a crack may be generated.

Referring to FIG. 7, as the flexible substrate 110 located in the folding area FA may include at least one groove pattern 111, if a crack is generated in the foldable display apparatus, the crack may be prevented from being propagated through the folding area FA.

Also, although FIG. 7 illustrates that folding is performed based on the foldable display apparatus of FIGS. 1 and 2, without limitation to this example, it is to be understood that the foldable display apparatus to which the structural characteristic of the embodiment and the folding area in FIGS. 4 to 6 is applied is included in the scope of the present disclosure.

Figure 8:
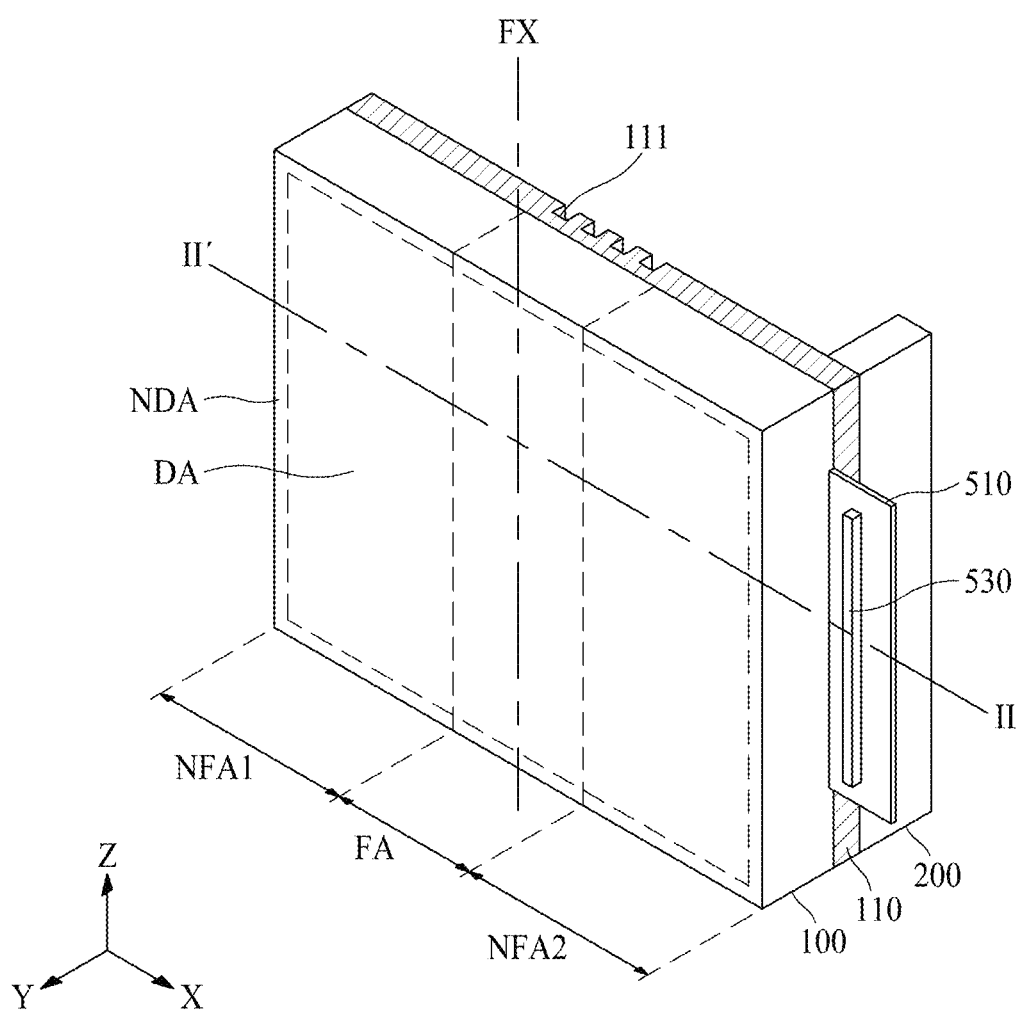
FIG. 8 is a perspective view illustrating a foldable display apparatus according to another embodiment of the present disclosure.
Figure 9:
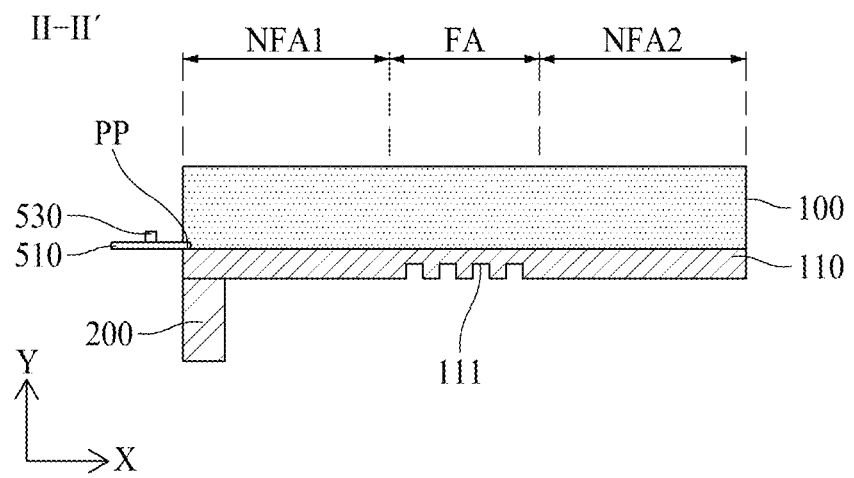
FIG. 9 is a cross-sectional view taken along line II-II' of FIG. 8.

FIG. 8 is a perspective view illustrating a foldable display apparatus according to another embodiment of the present disclosure, and FIG. 9 is a cross-sectional view taken along line II-IF of FIG. 8. The foldable display apparatus of FIGS. 8 and 9 is the same as the foldable display apparatus of FIGS. 1 and 2 except that the glass substrate 200 is partially formed in an area overlapped with a pad portion PP of the display panel 100. Therefore, the modified elements will be described in the following description, and repeated description of the other elements will be omitted.

Referring to FIGS. 8 and 9, the foldable display apparatus according to another embodiment of the present disclosure includes a display panel 100 including a flexible substrate 110, in which at least one folding area FA folded based on a folding axis FX, non-display areas NFA1 and NFA2 respectively disposed at one side and the other side of the folding area FA and a pad portion PP formed in at least in part of the non-display areas NFA1 and NFA2 are defined, and a glass substrate 200 disposed below the flexible substrate 110 and formed to overlap the pad portion PP, wherein the flexible substrate 110 includes at least one groove pattern 111 formed to overlap the folding area FA, and the groove pattern 111 is formed on a rear surface of the flexible substrate 110.

It is noted that the glass substrate 200 is formed in only a predetermined area overlapped with the pad portion PP. In this case, the glass substrate 200 may be defined as a glass of the pad portion. The glass substrate 200 may support the display panel 100 overlapped with the pad portion PP. In the foldable display apparatus according to another embodiment of the present disclosure, the glass substrate 200 may be formed in only a predetermined area overlapped with the pad portion PP, whereby a color difference or visibility generated on a boundary surface between the glass substrate 200 and another structure, which may be observed on the display surface of the display panel 100, may be improved.

Also, the foldable display apparatus according to another embodiment of the present disclosure, may include a circuit film 510 attached to the pad portion PP and a driving integrated circuit 530 packaged on the circuit film 510, as shown in FIGS. 8 and 9. The driving integrated circuit 530 may generate a data signal and a gate control signal based on image data and a timing synchronization signal supplied from an external display driving system, supply the data signal to a data line of each pixel through the pad portion and supply the gate control signal to a gate driving circuit.

Figure 10A:
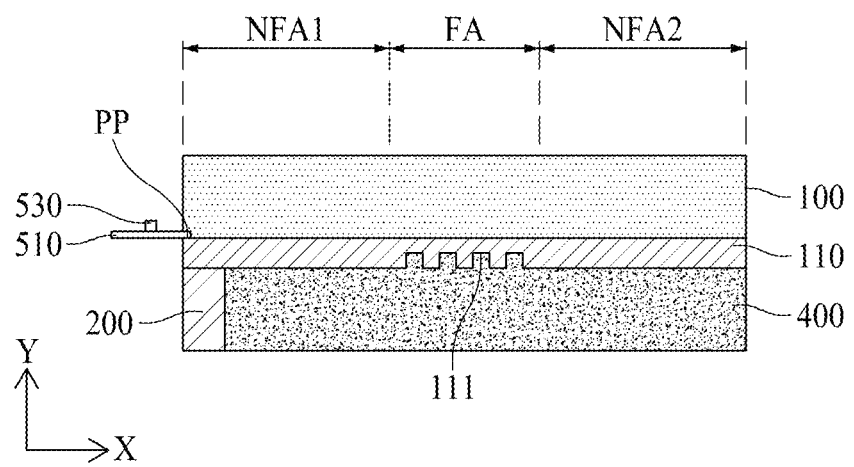
FIGS. 10A, 10B and 10C are cross-sectional views illustrating a foldable display apparatus according to another embodiment of the present disclosure.
Figure 10B:
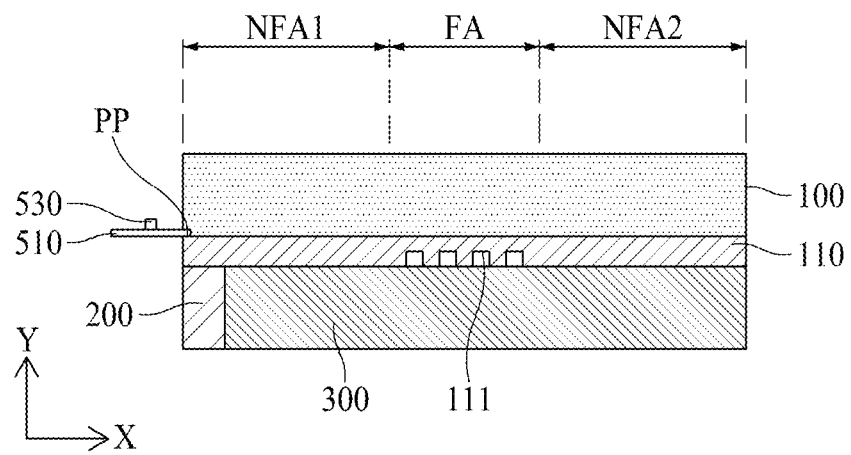
Figure 10C:
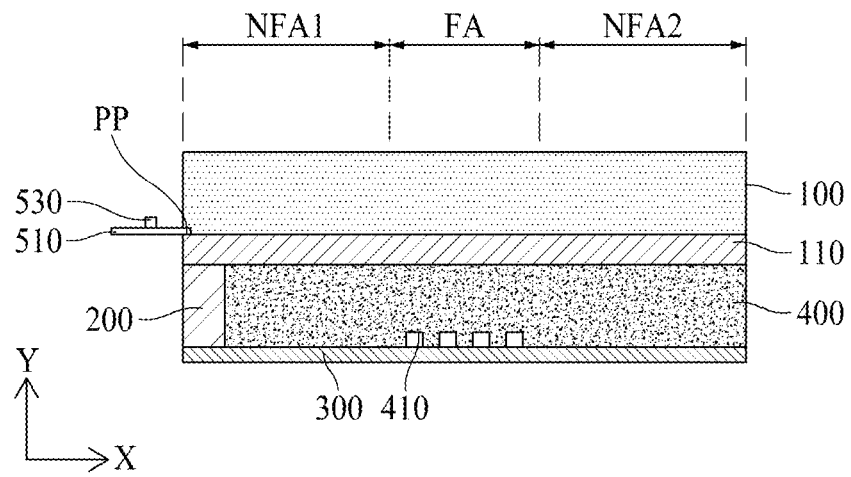

FIGS. 10A, 10B and 10C are cross-sectional views illustrating a foldable display apparatus according to another embodiment of the present disclosure.

Referring to FIG. 10A, the filling member 400 may be disposed to adjoin the rear surface of the flexible substrate that includes a groove pattern 111 of the flexible substrate 110. The filling member 400 filled in the groove pattern 111 during folding and unfolding operation of the foldable display apparatus according to the present disclosure may provide a predetermined restoring force after folding and unfolding operation of the foldable display apparatus, and crease generated in the folding area FA may be minimized through the restoring force of the filling member 400. According to one example, the filling member 400 may be disposed on the rear surface of the flexible substrate 110 at the same height as that of the glass substrate 200, whereby rear flatness of the foldable display apparatus may be increased.

Referring to FIG. 10B, the pattern frame 300 may be disposed to cover the rear surface of the groove pattern 111 and the flexible substrate 110, and the pattern frame 300 may cover the side of the glass substrate 200 which disposed to overlap the pad portion PP. The pattern frame 300, as described in FIGS. 5A and 5B, may include a plurality of opening patterns 310 formed to correspond to the folding area FA.

Referring to FIG. 10C, the foldable display apparatus according to another embodiment of the present disclosure includes a display panel 100 including a flexible substrate 110, in which at least a portion of at least one folding area FA folded based on a folding axis FX, non-display areas NFA1 and NFA2 respectively disposed at one side and the other side of the folding area FA, and a pad portion formed in at least a portion of the non-display areas NFA1 and NFA2 are defined, a glass substrate 200 disposed below the flexible substrate 110 and formed to overlap the pad portion, a filling member 400 disposed on a rear surface of the flexible substrate 110, and a pattern frame 300 covering a rear surface of the filling member 400 and the glass substrate 200, wherein the filling member includes a filling member groove pattern 410 corresponding to the folding area FA, and the filling member groove pattern 410 is formed on the rear surface of the filling member 400.

Also, the flexible substrate 110 may be formed without a groove pattern, and the filling member 400 disposed on the rear surface of the flexible substrate 110 may include a filling member groove pattern 410. The filling member 400 may cover the side of the glass substrate 200 while covering the rear surface of the flexible substrate 110. The filling member groove pattern 410 may be formed in an area corresponding to the folding area FA. The filling member groove pattern 410 may prevent crack propagation if the crack generated in the display apparatus is propagated through the folding area FA. The pattern frame 300 may be disposed below the display panel 100, and may be coupled to the rear surface of the glass substrate 200 and the filling member 400, whereby rigidity of the display panel 100 from the external physical impact may be enhanced.

Figure 11:
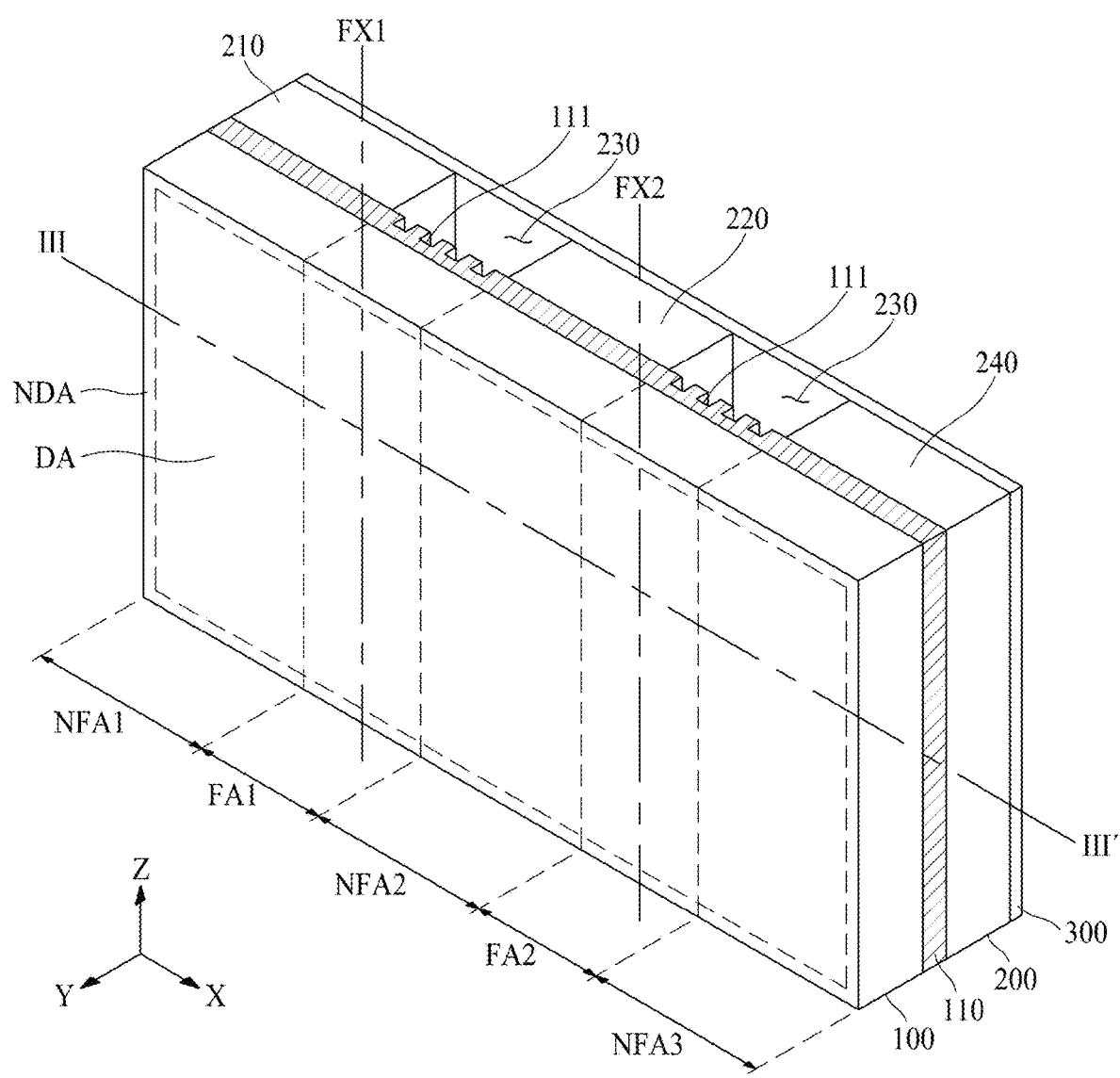
FIG. 11 is a perspective view illustrating a foldable display apparatus according to still another embodiment of the present disclosure.
Figure 12A:
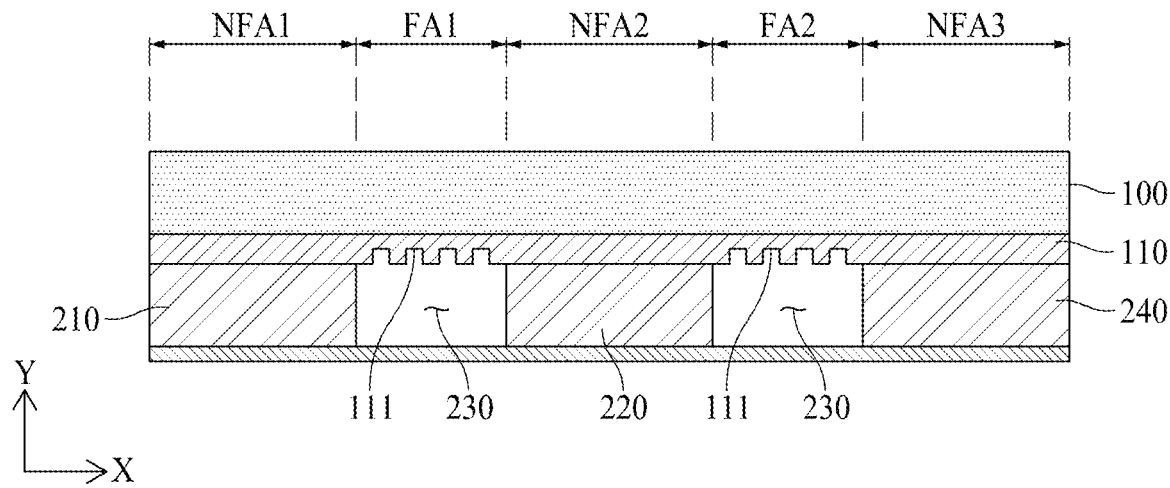
FIG. 12A is a cross-sectional view taken along line of FIG. 11.

FIG. 11 is a perspective view illustrating a foldable display apparatus according to still another embodiment of the present disclosure, and FIG. 12a is a cross-sectional view taken along line of FIG. 11.

The foldable display apparatus according to one embodiment of the present disclosure in FIGS. 11 and 12A may have the same structure as that of the foldable display apparatus shown in FIGS. 1 and 2 except that the foldable display apparatus includes two first folding area FA1 and second folding area FA2 spaced apart from each other, a first non-folding area NFA1 located at one side of the first folding area FA1, a second non-folding area NFA2 located between the first folding area FA1 and the second folding area FA2, and a third non-folding area NFA3 located at the other side of the second folding area FA2. The first non-folding area NFA1, the second non-folding area NFA2 and the third non-folding area NFA3 may respectively be supported by a first glass substrate 210, a second glass substrate 220 and a third glass substrate 240, and may substantially be formed as flat surfaces even during folding and unfolding driving of the foldable display apparatus.

Also, although the structure of the filling member 400, the filling member groove pattern 410 and the additional pattern frame 330 is not applied to the embodiment of FIGS. 11 and 12A, it is to be understood that the foldable display apparatus to which the structural characteristic of the embodiment and the folding area in FIGS. 4 to 6 is applied is included in the scope of the present disclosure.

Figure 12B:
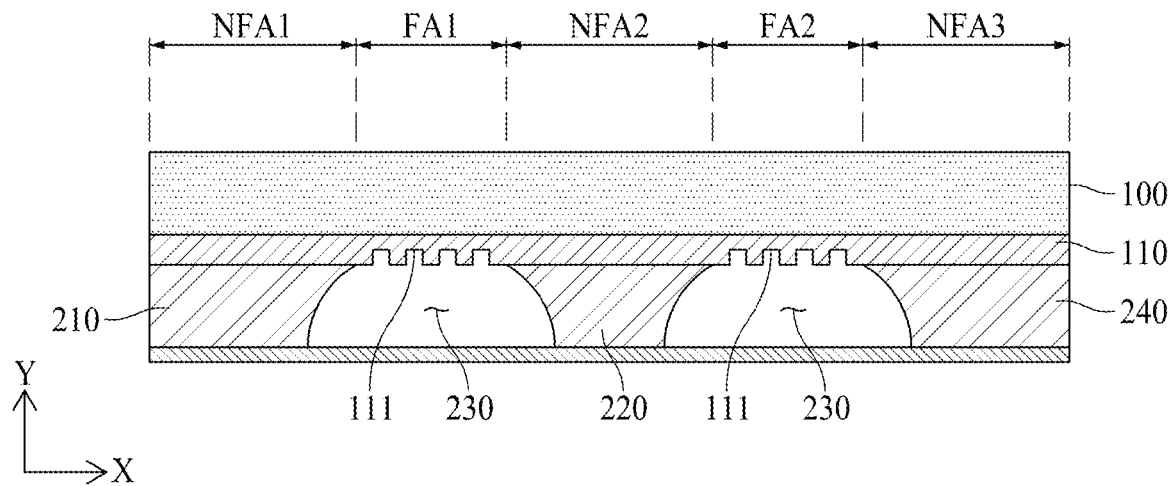
FIG. 12B is a cross-sectional view illustrating a foldable display apparatus according to still another embodiment of the present disclosure.

FIG. 12B is a cross-sectional view illustrating a foldable display apparatus according to still another embodiment of the present disclosure. Since the foldable display apparatus of FIG. 12B has a structure similar to that of the foldable display apparatus shown in FIG. 12A except that the first glass substrate 210, the second glass substrate 220 and the third glass substrate 240 are formed to have curved etching surfaces, its repeated description will be omitted.

Referring to FIG. 12B, the first glass substrate 210, the second glass substrate 220 and the third glass substrate 240 may have curved etching surfaces at sides exposed toward the opening portion 230. Also, according to one example, the opening portion 230 may be formed to overlap at least a portion of non-folding areas NFA1, NFA2 and NFA3 as well as the folding area FA, and may be formed to be widened toward a lower side of the opening portion 230. Also, the etching surfaces of the first glass substrate 210, the second glass substrate 220 and the third glass substrate 240 may be defined by an ends of upper surfaces of the first glass substrate 210, the second glass substrate 220 and the third glass substrate 240 and an ends of lower surfaces of the first glass substrate 210, the second glass substrate 220 and the third glass substrate 240, which are disposed to adjoin the opening portion. The ends of the upper surfaces of the first glass substrate 210, the second glass substrate 220 and the third glass substrate 240, which are adjacent to the opening portion 230, may be located at the boundary of the folding area FA and the non-folding areas NFA1, NFA2 and NFA3, and the ends of the lower surfaces of the first glass substrate 210, the second glass substrate 220 and the third glass substrate 240, which are adjacent to the opening portion 230, may be formed at a position overlapped with the non-folding areas NFA1, NFA2 and NFA3.

Also, in the present disclosure, the etching surfaces of the first glass substrate 210, the second glass substrate 220 and the third glass substrate 240 are not limited to curved etching surfaces, and etching surfaces of a non-vertical surface structure may be applied to the etching surfaces of the first glass substrate 210, the second glass substrate 220 and the third glass substrate 240 without limitation. In detail, etching surfaces of an slanted slope, a curved slope and a stepped slope may selectively be used depending on their sectional shape.

Figure 13:
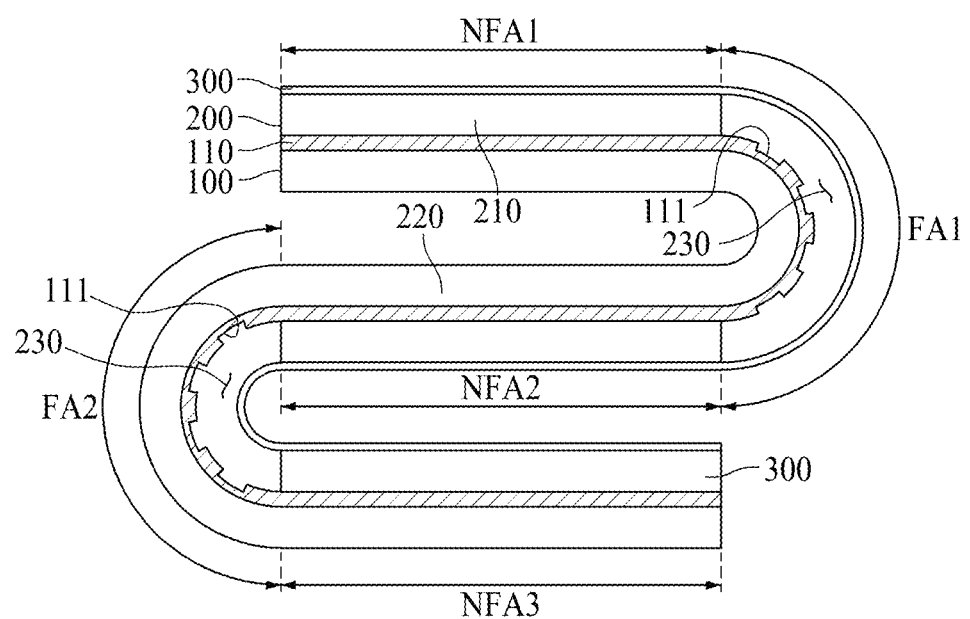
FIG. 13 is a cross-sectional view illustrating a folding appearance of a foldable display apparatus according to another embodiment of the present disclosure.

FIG. 13 is a cross-sectional view illustrating a folding appearance of a foldable display apparatus according to another embodiment of the present disclosure.

Referring to FIG. 13, it is noted that a first folding area FA1 is inwardly folded, and a second folding area FA2 is outwardly folded. In more detail, the foldable display apparatus of FIG. 13 has an inner folding structure in which a display surface located in a first non-folding area NFA1 and a display surface located in a second non-folding area NFA2 face each other, and may be folded such that the display surface located in the second non-folding area NFA2 and a display surface located in a third non-folding area NFA3 do not face each other.

As shown in FIG. 13, if folding states of the first folding area FA1 and the second folding area FA2 are different from each other in the foldable display device, tensile stress and compression stress generated during folding and unfolding operation may be different for each of the first folding area FA1 and the second folding area FA2 and positions of neutral planes may be formed differently from each other.

Therefore, if the folding states of the first folding area FA1 and the second folding area FA2 are different from each other in the foldable display device, the filling member 400, the filling member groove pattern 410 and the additional pattern frame 330 may be formed in the first folding area FA1 and the second folding area FA2 at different structures.

Also, the aforementioned structures may be applied to another embodiment of the present disclosure in which three or more folding areas are provided.

The foldable display apparatus according to the present disclosure may be described as follows.

The foldable display apparatus according to one embodiment of the present disclosure comprises a display panel including a flexible substrate, in which at least one folding area folded based on a folding axis and non-folding areas disposed at one side and the other side of the folding area are defined, a glass substrate disposed below the flexible substrate, including an opening portion corresponding to the folding area, and a pattern frame disposed below the glass substrate, wherein the flexible substrate includes at least one groove pattern formed to overlap the folding area, and the groove pattern is formed on a rear surface of the flexible substrate.

According to some embodiments of the present disclosure, the groove pattern may be a line pattern extended to be parallel with the folding axis.

According to some embodiments of the present disclosure, the groove pattern may include at least one sectional shape of a semicircle, a rectangle and a trapezoid.

According to some embodiments of the present disclosure, the pattern frame may include an opening pattern corresponding to the folding area.

According to some embodiments of the present disclosure, the foldable display apparatus may further comprise a filling member filled in the groove pattern.

According to some embodiments of the present disclosure, the filling member may be formed to additionally fill the opening portion of the glass substrate.

According to some embodiments of the present disclosure, the filling member may include a filling member groove pattern corresponding to the folding area, and the filling member groove pattern may be formed on a rear surface of the filling member.

According to some embodiments of the present disclosure, the pattern frame may further include an additional pattern frame corresponding to the opening portion, and the additional pattern frame may be formed between the filling member and the pattern frame.

A foldable display apparatus according to one embodiment of the present disclosure may comprise a display panel including a flexible substrate, in which at least one folding area folded based on a folding axis and non-folding areas disposed at one side and the other side of the folding area are defined, a glass substrate disposed below the flexible substrate, including an opening portion corresponding to the folding area, a pattern frame disposed below the glass substrate, and a filling member filled in the opening portion, wherein the filling member includes a filling member groove pattern corresponding to the folding area, and the filling member groove pattern is formed on a rear surface of the filling member.

According to some embodiments of the present disclosure, the pattern frame may further include an additional pattern frame corresponding to the opening portion, and the additional pattern frame may be formed between the filling member and the pattern frame.

According to some embodiments of the present disclosure, the filling member groove pattern may be a line pattern extended to be parallel with the folding axis.

According to some embodiments of the present disclosure, the filling member groove pattern may include at least one sectional shape of a semicircle, a rectangle and a trapezoid.

A foldable display apparatus according to one embodiment of the present disclosure comprises a display panel including a flexible substrate, in which at least one folding area folded based on a folding axis, non-folding areas disposed at one side and the other side of the folding area and a pad portion formed in at least a portion of the non-folding areas are defined, and a glass substrate disposed below the flexible substrate and formed to overlap the pad portion, wherein the flexible substrate includes at least one groove pattern formed to overlap the folding area, and the groove pattern is formed on a rear surface of the flexible substrate.

According to some embodiments of the present disclosure, the foldable display apparatus may further comprise a filling member disposed on the rear surface of the flexible substrate, wherein the filling member may have the same height as that of the glass substrate, and may be disposed to surround at least a portion of sides of the glass substrate.

According to some embodiments of the present disclosure, the filling member may include a filling member groove pattern corresponding to the folding area, and the filling member groove pattern may be formed on a rear surface of the filling member.

According to some embodiments of the present disclosure, the foldable display apparatus may further comprise a pattern frame disposed on the rear surface of the flexible substrate, wherein the pattern frame may have the same height as that of the glass substrate, and may be disposed to surround at least a portion of sides of the glass substrate.

A foldable display apparatus according to one embodiment of the present disclosure comprises a display panel including a flexible substrate, in which at least one folding area folded based on a folding axis, non-folding areas disposed at one side and the other side of the folding area and a pad portion formed in at least a portion of the non-folding areas are defined, a glass substrate disposed below the flexible substrate and formed to overlap the pad portion, a filling member disposed on a rear surface of the flexible substrate, and a pattern frame covering the glass substrate and a rear surface of the filling member, wherein the filling member includes a filling member groove pattern corresponding to the folding area, and the filling member groove pattern is formed on the rear surface of the filling member.

It will be apparent to those skilled in the art that the present disclosure described above is not limited by the above-described embodiments and the accompanying drawings and that various substitutions, modifications, and variations can be made in the present disclosure without departing from the spirit or scope of the disclosures. Consequently, the scope of the present disclosure is defined by the accompanying claims, and it is intended that all variations or modifications derived from the meaning, scope, and equivalent concept of the claims fall within the scope of the present disclosure.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

It will be apparent to those skilled in the art that various modifications and variations can be made in the foldable display apparatus of the present disclosure without departing from the technical idea or scope of the disclosure. Thus, it is intended that the present disclosure cover the modifications and variations of this disclosure provided they come within the scope of the appended claims and their equivalents.

What is claimed is:

1. A foldable display apparatus, comprising:
a display panel including a flexible substrate, in which at least one folding area folded based on a folding axis and non-folding areas disposed at one side and the other side of the folding area are defined;
a glass substrate disposed below the flexible substrate, including an opening portion corresponding to the folding area; and
a pattern frame disposed below the glass substrate,
wherein the flexible substrate includes at least one groove pattern formed to overlap the folding area, and the groove pattern is formed on a rear surface of the flexible substrate.

2. The foldable display apparatus of claim 1, wherein the groove pattern is a line pattern extended to be parallel with the folding axis.

3. The foldable display apparatus of claim 1, wherein the groove pattern includes at least one sectional shape of a semicircle, a rectangle and a trapezoid.

4. The foldable display apparatus of claim 1, wherein the pattern frame includes an opening pattern corresponding to the folding area.

5. The foldable display apparatus of claim 1, further comprising a filling member filled in the groove pattern.

6. The foldable display apparatus of claim 5, wherein the filling member is formed to additionally fill the opening portion of the glass substrate.

7. The foldable display apparatus of claim 6, wherein the filling member includes a filling member groove pattern corresponding to the folding area, and the filling member groove pattern is formed on a rear surface of the filling member.

8. The foldable display apparatus of claim 1, wherein the foldable display apparatus further includes an additional pattern frame corresponding to the opening portion, and the additional pattern frame is formed between the filling member and the pattern frame.

* * * * *